(12) United States Patent
Wang et al.

(10) Patent No.: US 12,413,126 B2
(45) Date of Patent: Sep. 9, 2025

(54) VIBRATION EXCITER (71) Applicant: AAC Microtech (Changzhou) Co., Ltd., Changzhou (CN)

(72) Inventors: Junsheng Wang, Shenzhen (CN); Jie Wu, Shenzhen (CN); Aijie Zhu, Shenzhen (CN); Qiang Zhang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 213 days.

(21) Appl. No.: 18/090,529

(22) Filed: Dec. 29, 2022

(65) Prior Publication Data

US 2024/0088769 A1  Mar. 14, 2024

Related U.S. Application Data

(63) Continuation of application No. PCT/CN2022/122707, filed on Sep. 29, 2022.

(30) Foreign Application Priority Data

Sep. 9, 2022  (CN) .......................... 202222407217.7

(51) Int. Cl.
*H02K 5/04* (2006.01)
*H02K 1/34* (2006.01)
(Continued)

(52) U.S. Cl.
CPC ............... *H02K 33/06* (2013.01); *H02K 1/34* (2013.01); *H02K 5/04* (2013.01); *H02K 33/18* (2013.01); *H02K 2203/03* (2013.01)

(58) Field of Classification Search
CPC .......... H02K 33/18; H02K 1/34; H02K 33/06; H02K 5/04
See application file for complete search history.

(56) References Cited

U.S. PATENT DOCUMENTS 2,769,103 A * 10/1956 Kristiansen ............ H02K 33/06
  335/230
6,707,196 B2 * 3/2004 Mayumi ............. H02K 5/1672
  310/49.15

(Continued)

FOREIGN PATENT DOCUMENTS

KR  20220017449 A  *  2/2022

*Primary Examiner* — Sean Kayes
(74) *Attorney, Agent, or Firm* — Wiersch Law Group (57) ABSTRACT

The present application provides a vibration exciter, including a casing with an accommodating cavity, a stator assembly assembled in the casing, and a vibrator assembly assembled in the accommodating cavity and driven by the stator assembly to vibrate. The stator assembly includes a polar core fixed on an inner side of the casing and a magnetic steel fixed on one side of the polar core away from the casing. The vibrator assembly includes a skeleton elastically connected to the casing, a mass block fixed to the skeleton, and a coil wound around the outer side of the skeleton. The skeleton is integrally formed and has a solid structure. In the present application, since the skeleton is a solid structure formed integrally, the skeleton is not easy to be deformed when the coils are wound, and the shape of the coils can be controlled, thus having a better shape.

9 Claims, 7 Drawing Sheets

(51) Int. Cl.
*H02K 33/06* (2006.01)
*H02K 33/18* (2006.01)

(56) References Cited

U.S. PATENT DOCUMENTS

| | | | |
|---|---|---|---|
| 2002/0175572 A1* | 11/2002 | Cho | H02K 29/06 310/216.001 |
| 2021/0265902 A1* | 8/2021 | Wang | B06B 1/045 |
| 2023/0198364 A1* | 6/2023 | Li | H02K 33/16 310/28 |

* cited by examiner

VIBRATION EXCITER

TECHNICAL FIELD

The present application relates to the technical field of vibration equipment, in particular to a vibration exciter.

BACKGROUND

At present, a vibration exciter in the related art mainly consists of a casing, a cover plate, a polar core, magnetic steel, a soft magnetic ring, a coil, and a coil support, and a vibration exciter system generates an induced electromotive force by cutting magnetic induction lines through the coil alternating current, so as to drive other related members to work. However, in the vibration exciter system in the related art, the coil is wound around a hollow support, and the hollow support is easy to deform, so that the shape of the coil is difficult to control while winding the coil, which affects the quality of the vibration exciter.

SUMMARY

An object of the present application is to provide a vibration motor, which can increase a winding speed of a coil and stabilize an outer shape of the coil.

The technical solutions of the present application are as follows.

The present application provides a vibration exciter, comprising:
  a casing with an accommodating cavity;
  a stator assembly assembled in the casing, comprising:
    a polar core fixed on the inner side of the casing;
    a magnetic steel fixed on one side of the polar core away from the casing; and
  a vibrator assembly assembled in the accommodating cavity and driven to vibrate by the stator assembly, comprising:
    a skeleton elastically connected to the casing;
    a mass block fixed to the skeleton, the skeleton being integrally formed and provided with a solid structure; and
    a coil wound around an outer side of the skeleton.

In an embodiment, the skeleton comprises a main body elastically connected to the casing, a first positioning protrusion and a second positioning protrusion extended in parallel in a direction toward the casing from two ends of the main body, wherein a gap is formed between the first positioning protrusion and the second positioning protrusion, and the coil is wound around the main body and located in the gap.

In an embodiment, the mass block comprises a first mass block fixedly assembled on a side of the first positioning protrusion away from the coil and a second mass block fixedly assembled on a side of the second positioning protrusion away from the coil.

In an embodiment, the vibration exciter further comprises a flexible printed circuit (FPC), wherein one end of the FPC is connected to one surface of the second positioning protrusion facing toward the coil, the coil being electrically connected to the FPC, and the other end of the FPC is led out to an outer side of the casing.

In an embodiment, an outer edge of one side of the second positioning protrusion is extended toward the casing to form an assembly block; one end of the FPC is fixed to the assembly block, and the other end of the FPC is bent and fixed to the outer side of the casing.

In an embodiment, the main body comprises a first end surface and a second end surface respectively located at two ends of the main body, and the vibration exciter comprises a first spring piece fixed to the first end surface and the casing, and a second spring piece fixed to the second end surface and the casing.

In an embodiment, a first threaded hole is provided on the first end surface of the main body, and a second threaded hole is provided on the second end surface of the main body; the vibration exciter further comprises a first screw arranged through the first spring piece and connected to the first threaded hole, and a second screw arranged through the second spring piece and connected to the second threaded hole; and/or,
  a first assemble hole is provided on the first end surface of the main body, and a second assemble hole is provided on the second end surface of the main body; the vibration exciter further comprises a first rivet arranged through the first spring piece and riveted to the first assemble hole, and a second rivet arranged through the second spring piece and riveted to the second assemble hole; and/or,
  the first spring piece is fixedly welded to the first end surface at a first welding spot, and the second spring piece is fixedly welded to the second end surface at a second welding spot.

In an embodiment, an inner side of the casing is protruded inward to form a third positioning protrusion, wherein a side of the third positioning protrusion away from the casing is provided with a positioning groove, and the polar core and the corresponding magnetic steel are both embedded in the positioning groove;
  when the vibrator assembly is in an initial state, the positioning groove directly faces the coil.

In an embodiment, the casing comprises an outer casing, an upper cover plate mounted at one end of the casing, and a lower cover plate assembled at the other end of the outer casing; the first spring piece and the second spring piece are respectively connected to two ends of the casing by means of glue dispensing and welding; the first spring piece is clamped and fixed by the upper cover plate and the outer casing, and the second spring piece is clamped and fixed by the lower cover plate and the outer casing.

In an embodiment, the lower cover plate comprises a positioning plate extending from a periphery of the lower cover plate to the upper cover plate; a notch corresponding to the positioning plate is arranged on a side of the outer casing close to the lower cover plate, and the positioning plate is embedded in the notch.

DETAILED DESCRIPTION OF THE EMBODIMENTS

The present application will be further described below in conjunction with the accompanying drawings and embodiments.

As shown in FIGS. 1-5, a vibration exciter includes a casing 1 with an accommodating cavity, a stator assembly 2 assembled in the casing 1, and a vibrator assembly 3 assembled in the accommodating cavity and driven to vibrate by the stator assembly 2. The stator assembly 2 includes a polar core 21 fixed at an inner side of the casing 1 and a magnetic steel 22 fixed at a side of the polar core 21 away from the casing 1. The vibrator assembly 3 includes a skeleton 31 elastically connected to the casing 1, a mass block 32 fixed to the skeleton 31, and a coil 34 wound around an outer side of the skeleton 31. The skeleton 31 is integrally formed and has a solid structure.

In this embodiment, the coil 34 is wound centrally on the skeleton 31. Since the skeleton 31 is a solid structure formed by integral injection molding, when the coil 34 is wound, the skeleton 31 is not easy to be deformed, and the shape of the coil 34 can be controlled, thus having a better shape.

Figure 2:
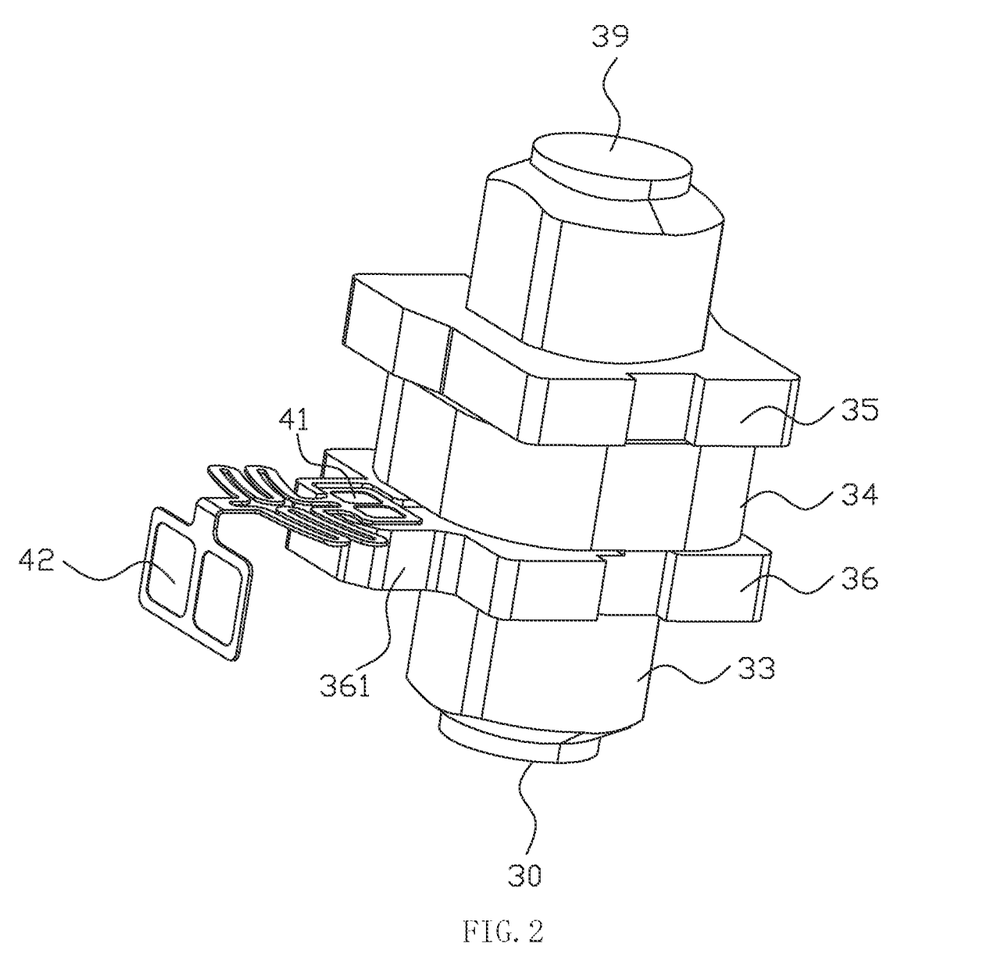
FIG. 2 is a structural diagram of a skeleton of the vibration exciter of the present application.

As shown in FIG. 2, the skeleton 31 includes a main body 33 elastically connected to the casing 1, a first positioning protrusion 35 and a second positioning protrusion 36 respectively extended and protruded from two ends of the main body 33 in parallel to the direction of the casing 1. A gap is formed between the first positioning protrusion 35 and the second positioning protrusion 36, and the coil 34 is wound around the main body 33 and located in the gap.

In this embodiment, the coil 34 is wound centrally on the main body 33, so that when the vibration exciter of the present invention is processed, the winding speed of the coil 34 becomes faster. The first positioning protrusion 35 and the second positioning protrusion 36 are located close to two ends of the main body 33, respectively, and they are two symmetrically distributed rectangular blocks. In other embodiments, the outer contour shapes of the first positioning protrusion 35 and the second positioning protrusion 36 may be consistent with the outer contour shape of the main body 33. However, this contour needs to be larger than that of the main body 33 after the coil 34 is assembled.

Figure 3:
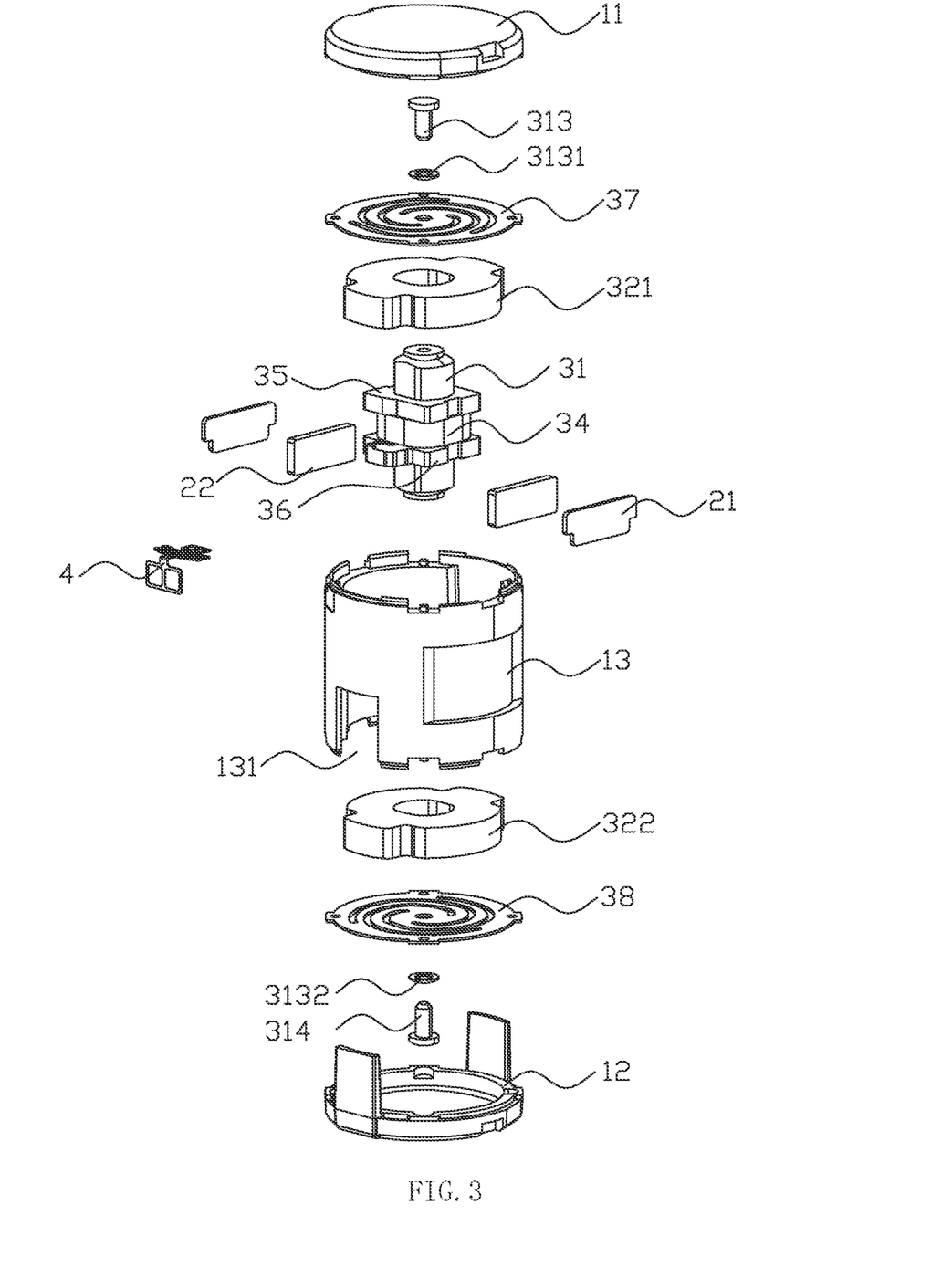
FIG. 3 is an exploded view of the vibration exciter according to an embodiment of the present application.
Figure 4:
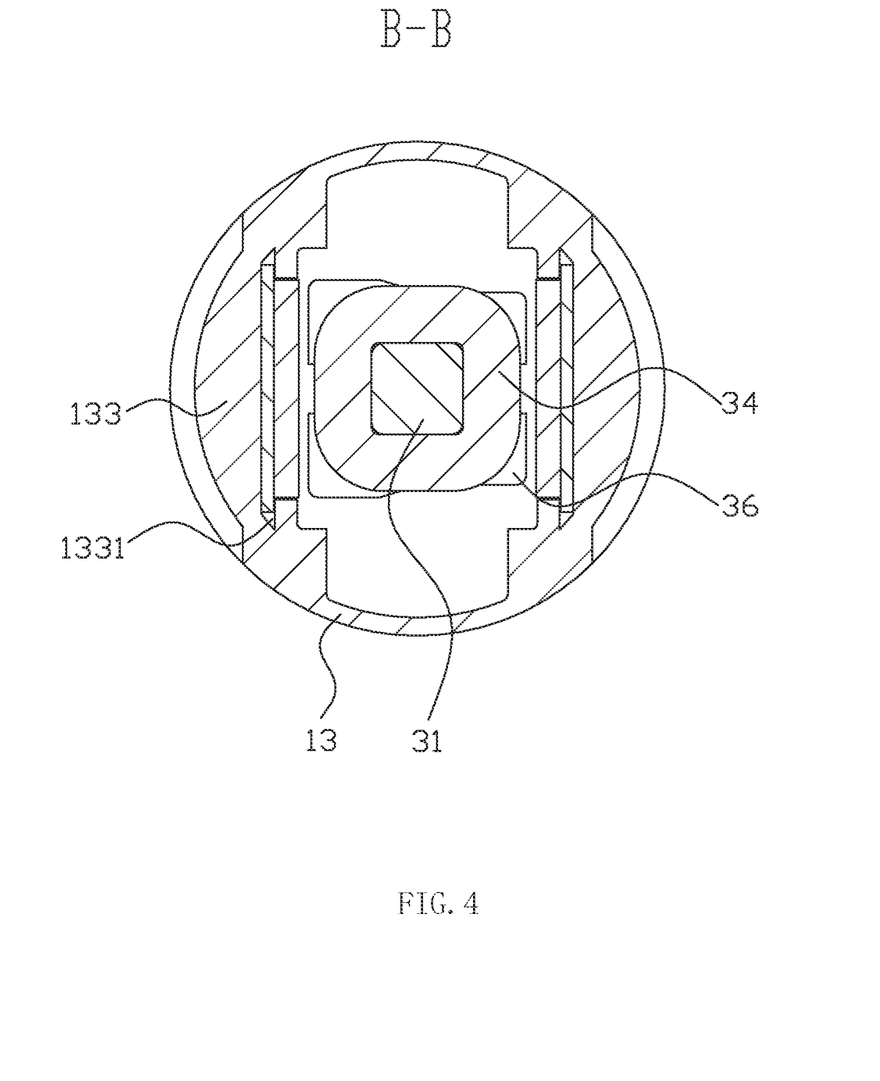
FIG. 4 is a cross-sectional view of the vibration exciter taken along a line B-B in FIG. 1 according to a first embodiment of the present application.

As shown in FIG. 3, the mass block includes a first mass block 321 fixedly assembled on one side of the first positioning protrusion 35 away from the coil 34 and a second mass block 322 fixedly assembled on one side of the second positioning protrusion 36 away from the coil 34.

In this embodiment, the effect of assembling the first mass block 321 and the second mass block 322 is to enable the vibration exciter of the present application to perform the stable movement after starting to work, and the first mass block 321 and the second mass block 322 are symmetrically assembled on the skeleton 31.

Figure 1:
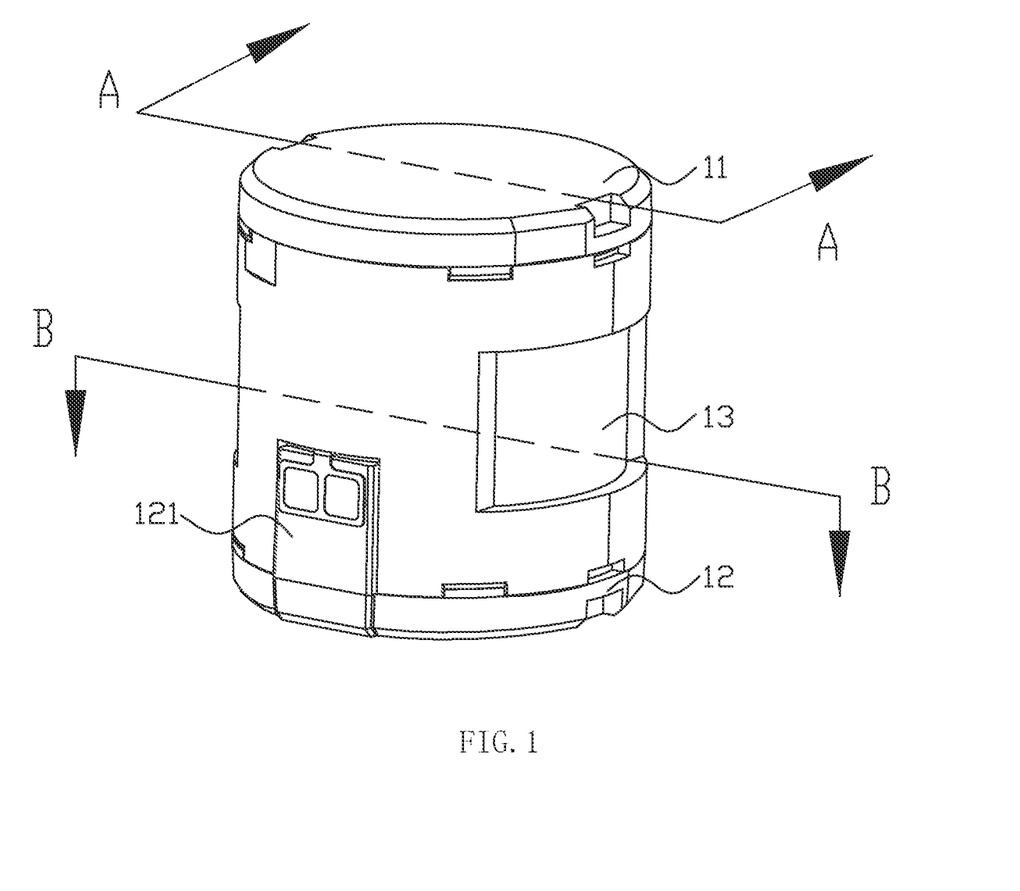
FIG. 1 is a structural view of a vibration exciter after assembled according to an embodiment of the present application.

As shown in FIGS. 1 and 2, the vibration exciter further includes a flexible printed circuit (FPC) 4, one end of which is connected to a surface of the second positioning protrusion 36 facing toward the coil 34. The coil 34 is electrically connected to the FPC 4. The other end of the FPC 4 is led out to the outer side of the casing 1. A peripheral of one side of the second positioning protrusion 36 is extended toward the casing 1 to form an assembling block 361. One end of the FPC 4 is fixed to the fitting block 361, and the other end of the FPC 4 is fixed to the outer side of the casing 1. In this embodiment, the FPC4 is in a bent form, and a portion of the FPC4 connected to the assembly block 361 is provided with a first electrode 41. The coil 34 is connected to the first electrode 41. The other end of the FPC 4 connected to the casing 1 is provided with a second electrode 42, which is configured to connect a circuit and provide a power supply for the operation of the vibration exciter.

Figure 5:
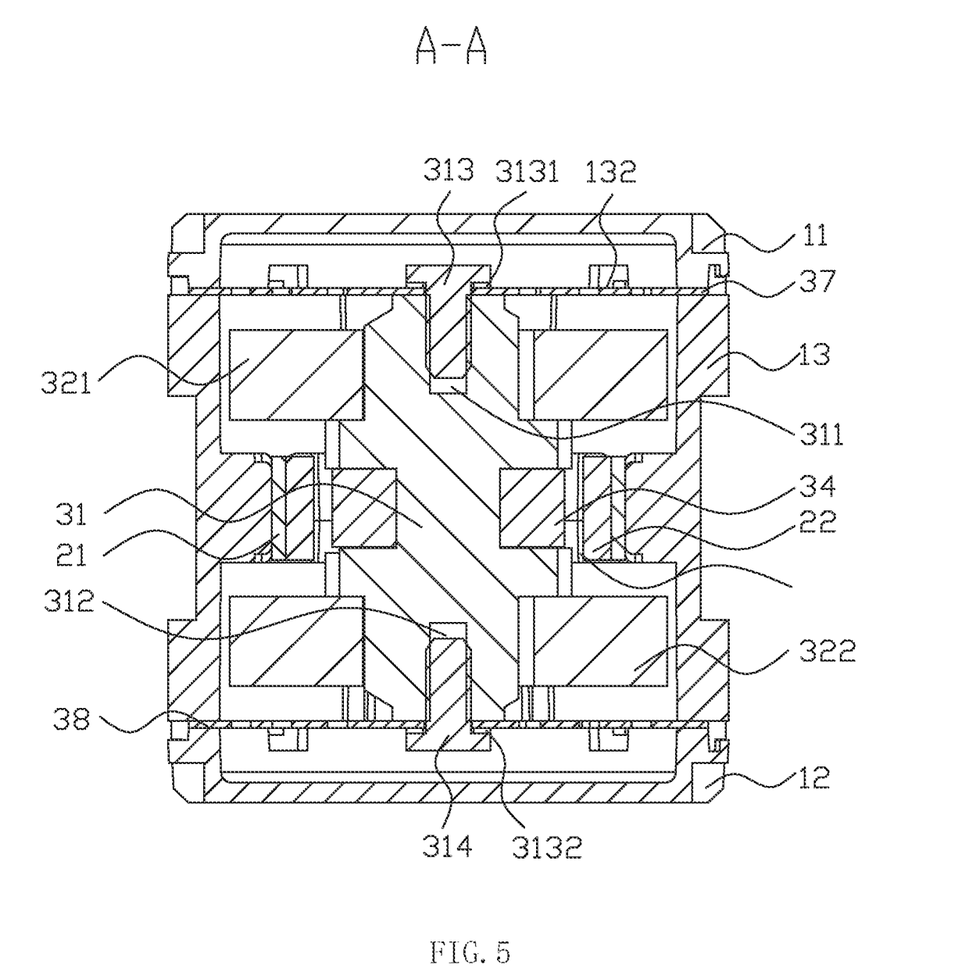
FIG. 5 is a cross-sectional view of the vibration exciter taken along a line A-A in FIG. 1 according to the first embodiment of the present application.

As shown in FIGS. 2 and 5, the main body 33 of the skeleton 31 includes a first end surface 39 and a second end surface 30 respectively located at two ends thereof. The vibration exciter includes a first spring piece 37 fixed to the first end surface 39 and the casing 1, and a second spring piece 38 fixed to the second end surface 30 and the casing 1. In this embodiment, the first spring piece and the second spring piece are disk-shaped metal objects that are spirally hollowed out.

Combined with FIG. 5, in the first embodiment, a first threaded hole 311 is provided on the first end surface 39 of the main body 33, and a second threaded hole 312 is provided on the second end surface 30 of the main body 33. The vibration exciter further includes a first screw 313 arranged through the first spring piece 37 and connected to the first threaded hole 311, and a second screw 314 arranged through the second spring piece 38 and connected to the second threaded hole 312. In this embodiment, when the first screw 313 is connected to the first threaded hole 311, a first washer 3131 is nested on the first screw 313. When the second screw 314 is connected to the second threaded hole 312, a second washer 3132 is nested on the second screw 314. The function of the washers is to enable the first screw 313 to be connected to the first threaded hole 311 more tightly.

Figure 6:
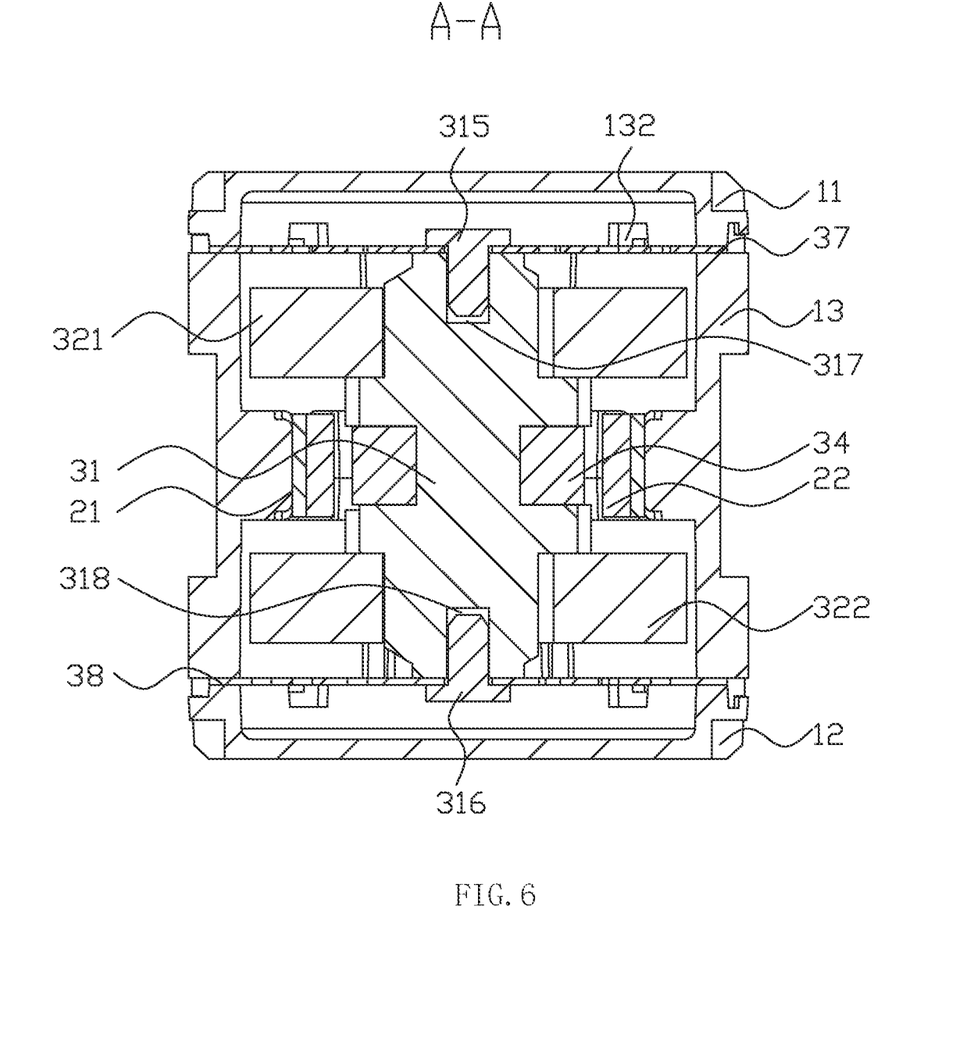
FIG. 6 is a cross-sectional view of the vibration exciter taken along the line A-A according to a second embodiment of the present application.

Combined with FIG. 6, in a second embodiment, a first threaded hole 317 may be arranged on the first end surface 39 of the main body 33, and a second threaded hole 318 may be arranged on the second end surface 30 of the main body 33. The vibration exciter further includes a first rivet 315 arranged through the first spring piece 37 and riveted to the first threaded hole 317, and a second rivet 316 arranged through the second spring piece 38 and riveted to the second threaded hole 318. In this embodiment, the first spring piece 37 is connected to the first threaded hole 317 through the first rivet 315, and the second spring piece 38 is connected to the second threaded hole 318 through the second rivet 316.

Figure 7:
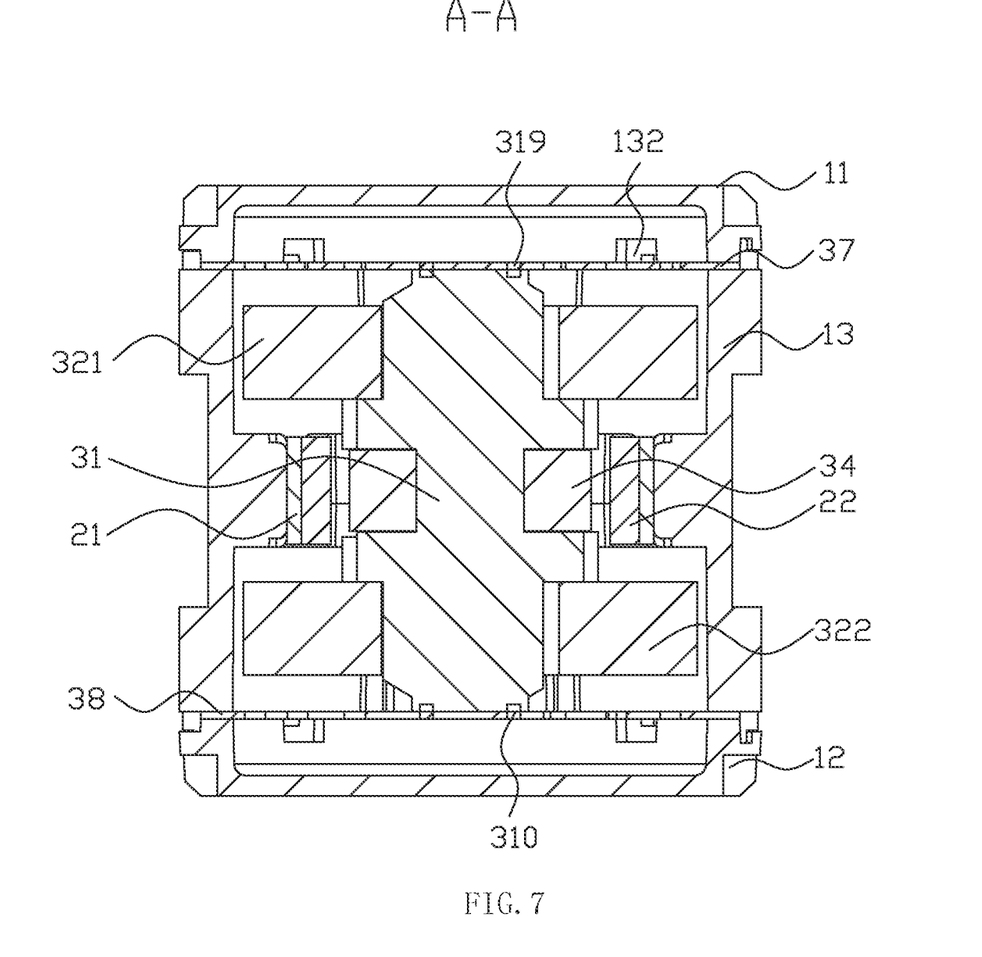
FIG. 7 is a cross-sectional view of the vibration exciter taken along the line A-A according to a third embodiment of the present application.

Combined with FIG. 7, in the third embodiment, the first spring piece 37 may also be fixedly welded to the first end surface 39 at a welding spot 319, and the second spring 38 may also be fixedly welded to the second end surface 30 at a welding spot 310.

As shown in FIGS. 4-7, an inner side of the casing 1 is protruded inward to form a third positioning protrusion 133, and a side of the third positioning protrusion 133 away from the casing 1 is provided with a positioning groove 1331. The polar core 21 and the corresponding magnetic steel 22 are both embedded in the positioning groove 1331. When the vibrator assembly 3 is in the initial state, the positioning groove 1331 is directly opposite to the coil 34. In this embodiment, a pair of third positioning protrusions 133, a pair of polar cores 21, and a pair of magnetic steel bars 22 are arranged in the casing. In other embodiments, the number of the third positioning protrusions 133, the number of the polar cores 21, and the number of the magnetic steels 22 may be increased or decreased according to practical situations.

In this embodiment, the magnetic induction is generated by the stator assembly 2 formed by the polar core 21 and the magnetic steel 22. When the coil 34 is energized, the alternating current of the coil 34 cuts magnetic induction lines of the stator assembly 2, thereby generating an induced electromotive force and further driving the vibrator assembly 3 to move. In an embodiment, two third positioning protrusions 133 are arranged oppositely on the inner side of the casing 1, and two stator assemblies 2 (a polar core 21 and a magnetic steel 22) are arranged oppositely.

As shown in FIGS. 5-7, the casing 1 includes an outer casing 13, an upper cover plate 11 assembled on one end of the outer casing 13, and a lower cover plate 12 assembled on the other end of the outer casing 13. The first spring piece 37 and the second spring piece 38 are respectively connected to two ends of the outer casing 13 by means of glue dispensing and heating. The first spring piece 37 is clamped and fixed by the upper cover plate 11 and the outer casing 13, and the second spring piece 38 is clamped and fixed by the lower cover plate 12 and the outer casing 13. In this embodiment, the first spring piece 37 and the second spring 38 are fixed to the casing 1 by means of glue dispensing and heating. The glue dispensing refers to driving glue out by using a glue gun, so that the first spring piece 37 and the second spring piece 38 are bonded to the casing 1. The heating refers to a plastic point 132 where the first spring piece 37 and the second spring piece 38 are respectively clamped on the outer casing 13. The plastic points 132 are melted after heating, and the first spring piece 37 and the second spring piece 38 can be fixed on the outer casing 13 after the plastic points 132 are cooled and solidified.

As shown in FIGS. 1, 2, and 5-7, the lower cover plate 12 includes a positioning plate 121 extending from a periphery of the lower cover plate 12 to the upper cover plate 11. A side of the outer casing 13 close to the lower cover plate 12 is provided with a notch 131 corresponding to the positioning plate 121. The positioning plate 121 is embedded in the notch 131. In this embodiment, the positioning plate 121 and the notches 131 are not completely assembled, but a gap is left therebetween. The FPC 4 is bent out from the gap, and the other end thereof is fixedly connected to the casing 1.

Described above are only embodiments of the present application. It should be noted that, for those skilled in the art, improvements made without departing from the concept of the present application shall fall within the protection scope of the present application.

What is claimed is:

1. A vibration exciter, comprising:
    a casing with an accommodating cavity;
    a stator assembly assembled in the casing, comprising:
       a polar core fixed on an inner side of the casing;
       a magnetic steel fixed on one side of the polar core away from the casing; and
    a vibrator assembly assembled in the accommodating cavity and driven to vibrate by the stator assembly, comprising:
       a skeleton elastically connected to the casing;
       a mass block fixed to the skeleton, the skeleton being integrally formed and provided with a solid structure; and
       a coil wound around an outer side of the skeleton;
    wherein the skeleton comprises:
       a main body elastically connected to the casing;
       a first positioning protrusion; and
       a second positioning protrusion extended in parallel in a direction toward the casing from two ends of the main body;
       wherein a gap is formed between the first positioning protrusion and the second positioning protrusion, and the coil is wound around the main body and located in the gap.

2. The vibration exciter of claim 1, wherein the mass block comprises:
    a first mass block fixedly assembled on a side of the first positioning protrusion away from the coil; and
    a second mass block fixedly assembled on a side of the second positioning protrusion away from the coil.

3. The vibration exciter of claim 1, further comprising a flexible printed circuit (FPC), wherein one end of the FPC is connected to one surface of the second positioning protrusion facing toward the coil, the coil being electrically connected to the FPC, and the other end of the FPC is led out to an outer side of the casing.

4. The vibration exciter of claim 3, wherein an outer edge of one side of the second positioning protrusion is extended toward the casing to form an assembly block; one end of the FPC is fixed to the assembly block, and the other end of the FPC is bent and fixed to the outer side of the casing.

5. The vibration exciter of claim 1, wherein the main body comprises a first end surface and a second end surface located at two ends of the main body, respectively; and the vibration exciter comprises a first spring piece fixed to the first end surface and the casing, and a second spring piece fixed to the second end surface and the casing.

6. The vibration exciter of claim 5, wherein a first threaded hole is provided on the first end surface of the main body, and a second threaded hole is provided on the second end surface of the main body; the vibration exciter further comprises a first screw arranged through the first spring piece and connected to the first threaded hole, and a second screw arranged through the second spring piece and connected to the second threaded hole; and/or,
    a first assemble hole is provided on the first end surface of the main body, and a second assemble hole is provided on the second end surface of the main body; the vibration exciter further comprises a first rivet arranged through the first spring piece and riveted to the first assemble hole, and a second rivet arranged through the second spring piece and riveted to the second assemble hole; and/or,
    the first spring piece is fixedly welded to the first end surface at a first welding spot, and the second spring piece is fixedly welded to the second end surface at a second welding spot.

7. The vibration exciter of claim 1, wherein an inner side of the casing is protruded inward to form a third positioning protrusion, wherein a side of the third positioning protrusion away from the casing is provided with a positioning groove, and the polar core and the corresponding magnetic steel are both embedded in the positioning groove;
    when the vibrator assembly is in an initial state, the positioning groove directly faces the coil.

8. The vibration exciter of claim 5, wherein the casing comprises an outer casing, an upper cover plate mounted at one end of the casing, and a lower cover plate assembled at the other end of the outer casing; the first spring piece and the second spring piece are respectively connected to two ends of the casing by means of glue dispensing and welding; the first spring piece is clamped and fixed by the upper cover plate and the outer casing, and the second spring piece is clamped and fixed by the lower cover plate and the outer casing.

9. The vibration exciter of claim 8, wherein the lower cover plate comprises a positioning plate extending from a periphery of the lower cover plate to the upper cover plate; a notch corresponding to the positioning plate is arranged on a side of the outer casing close to the lower cover plate, and the positioning plate is embedded in the notch.

\* \* \* \* \*